US011888159B1

(12) United States Patent
Mahankali et al.

(10) Patent No.: US 11,888,159 B1
(45) Date of Patent: Jan. 30, 2024

(54) MATERIAL AND METHOD FOR INCREASING CATALYTIC ACTIVITY OF ELECTROCATALYSTS

(71) Applicant: Lyten, Inc., San Jose, CA (US)

(72) Inventors: Kiran Mahankali, Milpitas, CA (US); Arjun Mendiratta, La Honda, CA (US)

(73) Assignee: LYTEN, INC., San Jose, CA (US)

( * ) Notice: Subject to any disclaimer, the term of this patent is extended or adjusted under 35 U.S.C. 154(b) by 0 days.

(21) Appl. No.: 18/108,530

(22) Filed: Feb. 10, 2023

(51) Int. Cl.
*H01M 4/587* (2010.01)
*H01M 4/36* (2006.01)
(Continued)

(52) U.S. Cl.
CPC ............ *H01M 4/587* (2013.01); *B01J 21/18* (2013.01); *B01J 23/10* (2013.01); *B01J 35/0033* (2013.01);
(Continued)

(58) Field of Classification Search
CPC ...... H01M 4/587; H01M 4/364; H01M 4/622; H01M 2004/028; B01J 21/18; B01J 23/10; B01J 35/0033; B01J 37/0009; B01J 37/08
(Continued)

(56) References Cited

U.S. PATENT DOCUMENTS

| | | | | |
|---|---|---|---|---|
| 4,146,080 A | * | 3/1979 | Baum ............... | C22C 1/1036 75/240 |
| 4,927,713 A | * | 5/1990 | Garg ................. | C23C 28/00 428/665 |

(Continued)

FOREIGN PATENT DOCUMENTS

| | | | | |
|---|---|---|---|---|
| CA | 2045125 A1 | * | 5/1991 | ............... B22F 9/08 |
| CN | 101927149 A | * | 12/2010 | ............. B01J 13/04 |

(Continued)

OTHER PUBLICATIONS

Ling Zhang et al., "TiN/TiC hetereostructures embedded with single tungsten atoms enhance polysulfide entrapment and conversion for high-capacity lithium-sulfur battery applications." Energy Storage Materials 54, pp. 410-420. (Year: 2023).*

(Continued)

*Primary Examiner* — Patricia L. Hailey
(74) *Attorney, Agent, or Firm* — Zilka-Kotab, P.C.

(57) ABSTRACT

A material and method are provided for increasing catalytic activity of electrocatalysts. In use, a material comprises synthesized carbon-containing composite materials, synthesized metal-metal carbides, and a heterostructure material comprising the synthesized carbon-containing composite materials and the synthesized metal-metal carbides. The synthesized metal-metal carbides are atom-decorated, at least in part, on the synthesized carbon-containing composite material. Additionally, a method of increasing catalytic activity of an electrocatalyst includes dissolving a metal precursor into a first solution, where the metal precursor comprises a set of characteristics. A heterostructure material is created based on the first solution, wherein catalytic activity of the heterostructure material is a function of the set of characteristics, and wherein the heterostructure material includes a metal-metal carbide that is atom-decorated to synthesized carbon-containing composite materials.

13 Claims, 7 Drawing Sheets

TUNABLE ELECTROCATALYSTS

(51) Int. Cl.
  *H01M 4/62* (2006.01)
  *B01J 35/00* (2006.01)
  *B01J 37/08* (2006.01)
  *B01J 21/18* (2006.01)
  *B01J 23/10* (2006.01)
  *B01J 37/00* (2006.01)
  *H01M 4/02* (2006.01)

(52) U.S. Cl.
  CPC ............ *B01J 37/0009* (2013.01); *B01J 37/08* (2013.01); *H01M 4/364* (2013.01); *H01M 4/622* (2013.01); *H01M 2004/028* (2013.01)

(58) Field of Classification Search
  USPC .................................................. 502/101, 180
  See application file for complete search history.

(56) References Cited

U.S. PATENT DOCUMENTS

| | | | |
|---|---|---|---|
| 5,338,330 A * | 8/1994 | Polizzotti | ............... C22C 1/056 75/953 |
| 5,490,968 A * | 2/1996 | Polizzotti | ............... C04B 35/56 419/36 |
| 8,057,962 B2 | 11/2011 | Christian | |
| 11,264,624 B2 | 3/2022 | Cavaliere et al. | |
| 2005/0116230 A1 * | 6/2005 | Cabral, Jr. | ...... H01L 21/823842 257/69 |

FOREIGN PATENT DOCUMENTS

| | | | | |
|---|---|---|---|---|
| CN | 104114722 | * | 10/2014 | ............... C22C 1/10 |
| CN | 104114722 A | * | 10/2014 | ............... B22F 7/06 |
| CN | 109570493 A | * | 4/2019 | ............ B22F 1/0085 |
| WO | WO-2011014635 A2 | * | 2/2011 | ......... G01N 27/4166 |

OTHER PUBLICATIONS

Yujin Wang et al., "Refractory carbide reinforced tungsten matrix composites." Journal of Alloys and Compounds 925, pp. 1-29. (Year: 2022).*

Baoli Wang et al., "Electrochemical synergy between FeNi nanoalloy@tungsten carbide on N-doped graphitized carbon layers as an excellent electrocatalyst for oxygen evolution reaction." Electrochimica Acta 415, pp. 1-10. (Year: 2022).*

Chun'an Ma et al., "Preparation of Pt-mesoporous tungsten carbide/carbon composites via a soft-template method for electrochemical methanol oxidation." Journal of Alloys and Compounds 588, pp. 481-487. (Year: 2014).*

Baoli Wang et al., "Ni-enhanced molybdenum carbide loaded N-doped graphitized carbon as bifunctional electrocatalyst for overall water splitting." Applied Surface Science 572, pp. 1-19. (Year: 2022).*

Kiran Mahankali et al., "Interfacial behavior of water-in-salt electrolytes at porous electrodes and its effect on supercapacitor performance." Electrochimica Acta 326, pp. 1-8. (Year: 2019).*

Sheng Li et al., "Highly stable activity of cobalt based catalysts with tungsten carbide-activated carbon support for dry reforming of methane: Role of tungsten carbide." Fuel 311, pp. 1-11. (Year: 2022).*

Bup Ju Jeon et al., "Electrochemical characteristics of nc-Si/SiC composite for anode electrode of lithium ion batteries." Journal of Alloys and Compounds 590, pp. 254-259. (Year: 2014).*

Zhang et al, "In situ-grown tungsten carbide nanoparticles on nanocarbon as an electrocatalyst to promote the redox reaction kinetics of high-mass loading sulfur cathode for high volumetric performance", J. Mater. Chem. A, 2020, vol. 8, pp. 22240-22250.

Wang et al., "Electrocatalysts in lithium-sulfur batteries," Nano Research, Tsinghua University Press, Jan. 3, 2023, 30 pages.

Mammoottil Abraham et al., "Facet-Engineered Tungsten Disulfide for Promoting Polysulfide Electrocatalysis in Lithium-Sulfur Batteries," Inorg. Chem. 60 (17), Aug. 17, 2021, pp. 12883-12892.

Wodaje Bayeh et al., "Nitrogen-Doped Tungsten Carbide-Modified Graphite Felt as a Bifunctional Electrocatalyst for an All-Vanadium Redox Flow Battery," ACS Sustainable Chem. Eng. Sep. 6, 2022, 10 (37), pp. 12271-12278.

* cited by examiner

200

202 — DISSOLVING A METAL PRECURSOR INTO A FIRST SOLUTION, WHEREIN THE METAL PRECURSOR COMPRISES A SET OF CHARACTERISTICS

204 — CREATING A HETEROSTRUCTURE MATERIAL BASED ON THE FIRST SOLUTION, WHEREIN CATALYTIC ACTIVITY OF THE HETEROSTRUCTURE MATERIAL IS A FUNCTION OF THE SET OF CHARACTERISTICS, AND WHEREIN THE HETEROSTRUCTURE MATERIAL INCLUDES A METAL-METAL CARBIDE THAT IS ATOM-DECORATED TO SYNTHESIZED CARBON-CONTAINING COMPOSITE MATERIALS

FIG. 2

MATERIAL AND METHOD FOR INCREASING CATALYTIC ACTIVITY OF ELECTROCATALYSTS

FIELD OF THE INVENTION

The present invention relates to catalysts, and more particularly to increasing catalytic activity of electrocatalysts.

BACKGROUND

Currently, lithium-sulfur based batteries suffer from a variety of issues, including polysulfide shuttle effect, low conductivity, and slow kinetics. Electrocatalysts may be added to alleviate these issues. However, these electrocatalysts are often not easily synthesized (requiring a multi-step creation), in particular with a carbon host, and/or are non-scalable (requiring, for example, chemical vapor deposition instruments).

As such, there is thus a need for addressing these and/or other issues associated with the prior art.

SUMMARY

A material and method are provided for increasing catalytic activity of electrocatalysts. In one embodiment, a material includes synthesized carbon-containing composite materials, synthesized metal-metal carbides, and a heterostructure material comprising the synthesized carbon-containing composite materials and the synthesized metal-metal carbides. Additionally, the synthesized metal-metal carbides are atom-decorated, at least in part, on the synthesized carbon-containing composite material.

In various embodiments, the synthesized metal-metal carbides may include, at least in part, Tungsten-Tungsten Carbide (W-WC), a Tungsten-based compound, and/or at least one metal. Additionally, the heterostructure material may be configured to reduce a polysulfide shuttle effect, may be configured as a cathode material, may be configured to increase catalytic activity, and/or may be configured to increase conductivity or kinetics. Additionally, the catalytic activity may be configured based on a particle size and composition of the heterostructure material.

In various embodiments, the synthesized metal-metal carbides may be configured based on a binder. Additionally, a particle size of the heterostructure material may be configured based on the synthesized metal-metal carbides. A particle composition of the heterostructure material may be configured based on the synthesized metal-metal carbides.

In another embodiment, a method of increasing catalytic activity of an electrocatalyst includes dissolving a metal precursor into a first solution, where the metal precursor includes a set of characteristics. A heterostructure material is created based on the first solution. Additionally, catalytic activity of the heterostructure material is a function of the set of characteristics, and the heterostructure material includes a metal-metal carbide that is atom-decorated to synthesized carbon-containing composite materials.

In various embodiments, the metal precursor may include at least one of: Ammonium Metatungstate, $(NH_4)_6[H_2W_{12}O_{40}]$, Tungsten Trioxide ($WO_3$), Metallic Tungsten (W), Tungstic acid ($WO3 \cdot H2O$), Sodium tungstate dihydrate ($Na2WO4 \cdot 2H2O$), and/or Tungsten Disulfide ($WS_2$). Additionally, the metal-metal carbide may include Tungsten-Tungsten Carbide (W-WC).

In various embodiments, the set of characteristics may be selected to reduce a polysulfide shuttle effect, may be selected to improve one or more of conductivity or kinetics of the heterostructure material, and/or may be selected to be used as a cathode material.

In various embodiments, the first solution may include a binder, and/or the binder may include one or more of polyacrylonitrile (PAN), poly methylmethacrylate (PMMA), or polyethylenimine (PEI). Additionally, the binder, the metal precursor, and the synthesized carbon-containing composite materials may decompose together during a carbonization process to form the heterostructure material. Further, the heterostructure material may include a particle size and a particle composition that is a function of the binder and the metal precursor. Still yet, the metal precursor may include, at least in part, Tungsten, a Tungsten-based compound, and/or at least one metal, and the heterostructure material may include, at least in part, a Tungsten-Tungsten Carbide.

BRIEF DESCRIPTION OF THE DRAWINGS

FIG. 2 illustrates a method for increasing catalytic activity of electrocatalysts, in accordance with one embodiment.

DETAILED DESCRIPTION

Figure 1:
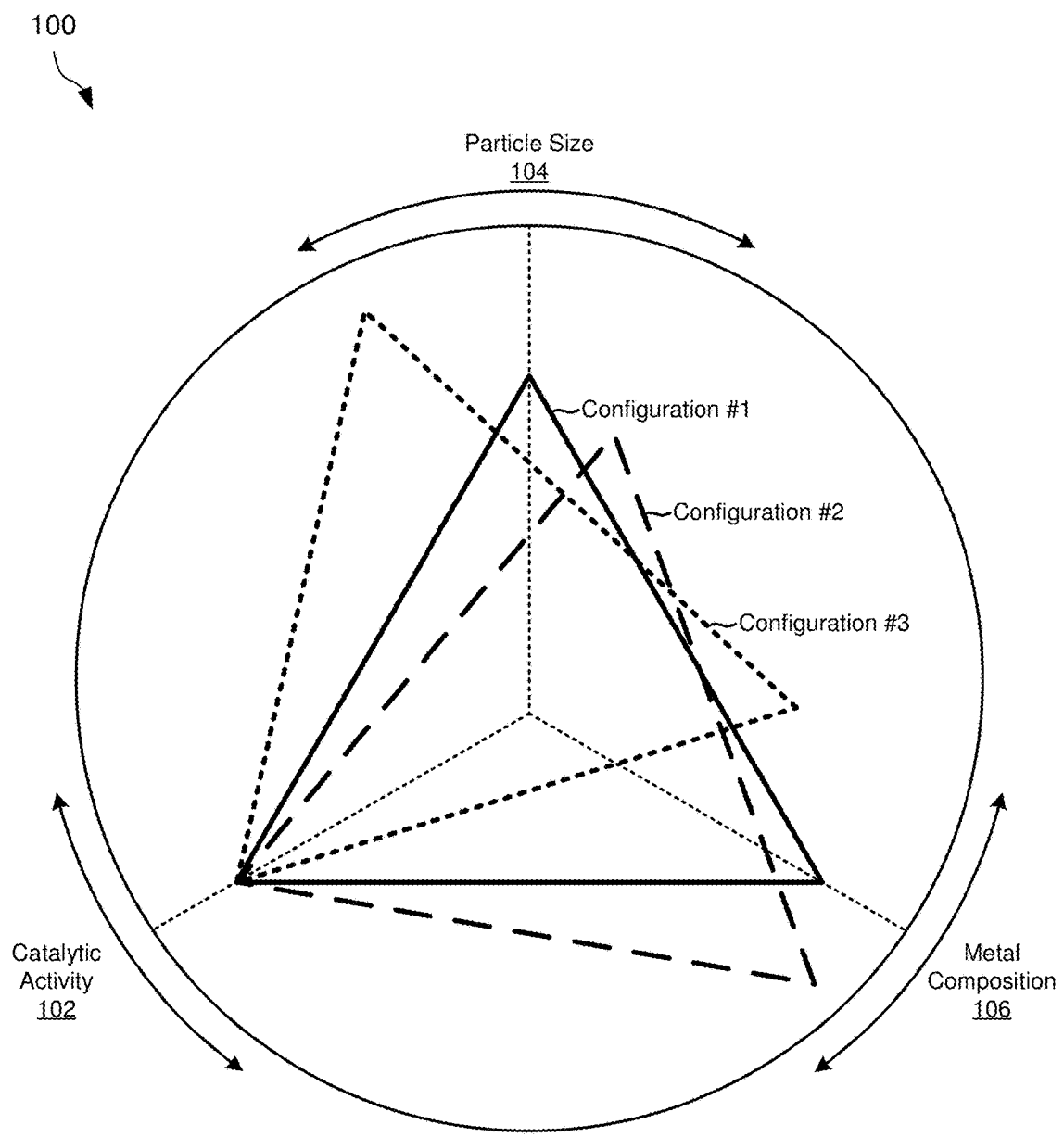
FIG. 1 illustrates a material configuration for increasing catalytic activity of electrocatalysts, in accordance with one embodiment.

Lithium-based ((and lithium-sulfur based in particular) batteries rely on reliable polysulfide stability to ensure maximized cell discharge and, ultimately, energy delivery. Polysulfide "shuttling" (polysulfides passing through to the negative electrode where they may undergo chemical reduction) between a cathode and anode within a lithium-based battery may lead to progressive loss of capacity. An improved configuration, structure, and/or method for more reliably and cost-effectively producing metal-metal carbide decorated carbon composites, as disclosed herein, may assist with maximizing catalytic activity and simultaneously limit polysulfide shuttling. Thus, there is a clear benefit to increasing the metallic content of the battery cell containing synthesized metal-metal carbides through maximizing metal-like bonds as well as metal-carbide bonds (that would otherwise ordinarily be comprised of mere carbon-based materials) within the cell structure, ultimately improving the capacity of the cell.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Exemplary Embodiments

FIG. 1 illustrates a material configuration 100 for increasing catalytic activity of electrocatalysts, in accordance with one embodiment.

In principle, a material configuration 100 may be modified to produce desired catalytic activity 102, particle size 104, and/or metal composition 106. In one embodiment, the ability to modify the material configuration 100 may be based, at least in part, on a selected electrocatalyst. The selected electrocatalyst may be modified based on a desired metal precursor. For example, a first metal precursor may be used to create an electrocatalyst with configuration #1 (the catalytic activity 102, the particle size 104, and/or the metal composition 106, etc.), and a second metal precursor may be used to create an electrocatalyst with configuration #2, and so on and so forth. As such, a metal precursor may be used to modify an electrocatalyst to have the desired properties including one or more of the catalytic activity 102, the particle size 104, and/or the metal composition 106, etc.).

Additionally, a measure of the catalytic activity 102 in a heterostructure material of the electrocatalyst may be designed to meet a calculated outcome (and/or to achieve a desired result). The particle size 104 may be ascertained prior to creating the electrocatalyst. Further, the metal composition 106 may be incorporated into the desired electrocatalyst. In this manner, an electrocatalyst may be created with specific properties relating to the catalytic activity 102, the particle size 104, and/or the metal composition 106. In one embodiment, an electrocatalyst may be created based on a single desired property (e.g. to increase the catalytic activity 102, reduce the particle size 104 to limit polysulfide shuttle, etc.). In other embodiments, an electrocatalyst may be created based on multiple desired properties (relating to the catalytic activity 102, the particle size 104, and/or the metal composition 106, etc.). Of course, it is to be appreciated that other properties (e.g. durability, stability, etc.) may be used as basis in creating a tunable electrocatalyst.

In one embodiment, the tunable electrocatalyst may include a heterostructure created based on a metal precursor. Additionally, the heterostructure may include synthesized metal-metal carbides. The synthesized metal-metal carbides may include, at least in part, Tungsten-Tungsten Carbide (W-WC), a Tungsten-based compound, and/or at least one metal. Additionally, the heterostructure material may be configured to reduce a polysulfide shuttle effect, may be configured as a cathode material, may be configured to increase catalytic activity, and/or may be configured to increase conductivity or kinetics. The catalytic activity may be configured based on a particle size and composition of the heterostructure material. Thus, in a related embodiment, specific combinations of the particle size 104 and the metal composition 106 may result in the specific catalytic activity 102 and, axiomatically, a broad spectrum of possible electrocatalyst configurations upon completion of the tunable electrocatalyst production process.

In another embodiment, the synthesized metal-metal carbides may be configured based on a binder including, but not limited to, polyacrylonitrile (PAN), poly methylmethacrylate (PMMA), and/or polyethylenimine (PEI). Additionally, a particle size of the heterostructure material may be configured based on the synthesized metal-metal carbides. A particle composition of the heterostructure material may be configured based on the synthesized metal-metal carbides. In addition, a metal precursor may be in any form capable of dissolution/dispersion/suspension when submitted to a solvent like Dimethylformamide (DMF) including, but not limited to, solid, gelatinous, and/or liquid form. Further, the heterostructure material may be calcinated in an inert gas (e.g. Nitrogen, Air+Nitrogen, Air+Argon (Ar), Argon, and/or Argon+Hydrogen ($H_2$), etc.) atmosphere at extremely high temperatures (in the range of 850 to 1,200 degrees Celsius) before producing the metal-metal carbide decorated carbon composite. Further, the final production of a metal-metal carbide decorated carbon composite can take the form of a carbon "sphere" (or any preconfigured shape) with a host of metal particles embedded within.

In still another embodiment, the ability to reliably control (tune) the size of smaller and smaller metal particles within a carbon structure may lead to maximized catalytic reactivity in a battery cell, thus increasing energy output therefrom while minimizing material required to meet battery capacity design standards. That is, maximized catalytic activity may improve the cycling performance of the battery cell containing synthesized metal-metal carbides (when compared to baseline cells without any catalyst additive). Further, maximized catalytic activity of the battery cell may bring the added benefit of performing increased electron conductivity with comparatively minimal metal-metal carbide material composition.

In yet another embodiment, recorded data indicates an increase in sustained battery capacity through the use of Tungsten Trioxide ($WO_3$). For example, WO3 being smaller sized precursor may result in smaller metal-metal carbide. Additionally, sometimes, at a lower temperatures, a metal-metal oxide-metal carbide (triple phase) may result irrespective of the precursor used. Further, WO3 is finer in size (<100 nm) compared to WS2 (<1 um). Because of the difference in size, the resulting W-WC compound with WO3 precursor is smaller in particle size compared to the one obtained from WS2. Smaller particles may impart better catalytic activity and improve the sulfur utilization thus improving the performance. In this manner, one or other possible reasons may influence sustained battery capacity.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

FIG. 2 illustrates a method 200 for increasing catalytic activity of electrocatalysts, in accordance with one embodiment. As an option, the method 200 may be implemented in the context of any one or more of the embodiments set forth in any previous and/or subsequent figure(s) and/or description thereof. Of course, however, the method 200 may be implemented in the context of any desired environment. Further, the aforementioned definitions may equally apply to the description below.

As shown, the method 200 may comprise dissolving and/or dispersing a metal precursor into a first solution, where the metal precursor comprises a set of characteristics. See operation 202. In addition, the method 200 may comprise creating a heterostructure material based on the first solution, where catalytic activity of the heterostructure material may be a function of the set of characteristics, and the heterostructure material may include a metal-metal carbide that is atom-decorated to synthesized carbon-containing composite materials. See operation 204.

In one embodiment, the metal precursor may include at least one of: Ammonium Metatungstate, $(NH_4)_6[H_2W_{12}O_{40}]$, Tungsten Trioxide ($WO_3$), Metallic Tungsten (W), Tungstic acid (WO3. H2O), Sodium tungstate dihydrate (Na2WO4. 2H2O), and/or Tungsten Disulfide ($WS_2$). Additionally, the metal-metal carbide may include, but is not limited to, Tungsten-Tungsten Carbide (W-WC). In one embodiment, the metal precursor included in the heterostructure creation process may be any known metal capable of conductivity. In addition, the metal precursor may be in any form capable of dissolution and/or dispersion when submitted to a solvent like Dimethylformamide (DMF) including, but not limited to, solid, gelatinous, and/or liquid form.

In another embodiment, the set of characteristics may be selected to reduce a polysulfide shuttle effect, may be selected to improve one or more of conductivity or kinetics of the heterostructure material, and/or may be selected to be used as a cathode material.

In yet another embodiment, the first solution may include a binder, and/or the binder may include one or more of polyacrylonitrile (PAN), poly methylmethacrylate (PMMA), or polyethylenimine (PEI). Additionally, the binder, the metal precursor, and the synthesized carbon-containing composite materials may decompose together during a carbonization process to form the heterostructure material. Further, the heterostructure material may include a particle size and a particle composition that is a function of the binder and the metal precursor. Still yet, the metal precursor may include, at least in part, Tungsten, a Tungsten-based compound, and/or at least one metal, and the heterostructure material may include, at least in part, a Tungsten-Tungsten Carbide.

In still another embodiment, the ability to reliably control (tune) the size of smaller and smaller metal particles within a carbon structure may lead to maximized catalytic reactivity in a battery cell, thus increasing energy output therefrom while minimizing material required to meet battery capacity design standards.

Figure 3:
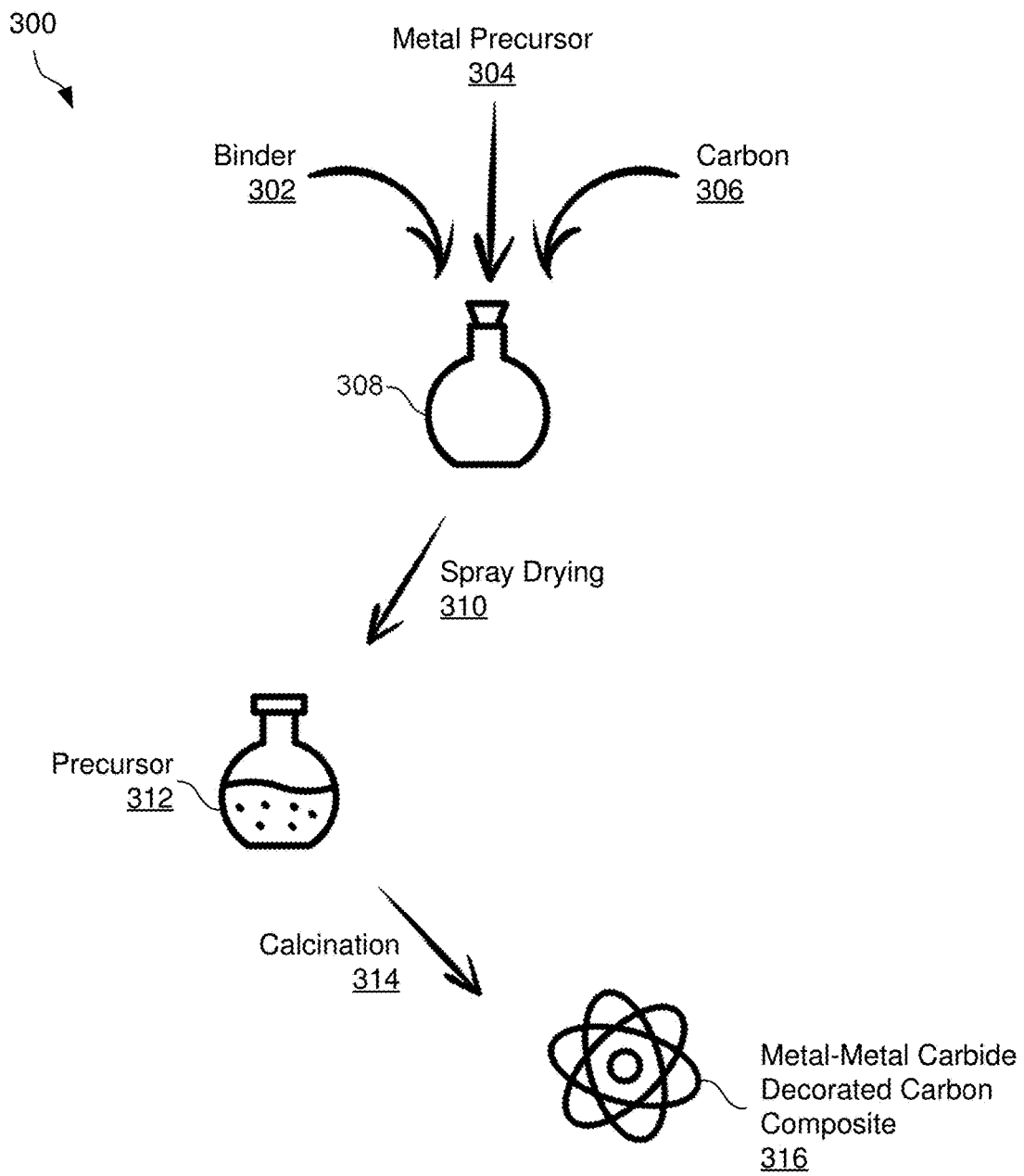
FIG. 3 illustrates a process for creating metal-metal carbide decorated carbon composites, in accordance with one embodiment.

FIG. 3 illustrates a process 300 for creating metal-metal carbide decorated carbon composites, in accordance with one embodiment. As an option, the process 300 may be implemented in the context of any one or more of the embodiments set forth in any previous and/or subsequent figure(s) and/or description thereof. Of course, however, the process 300 may be implemented in the context of any desired environment. Further, the aforementioned definitions may equally apply to the description below.

As shown, the process 300 may comprise combining a binder 302, a metal precursor 304, and a carbon source 306, resulting in a mixture 308. The mixture 308 may then be spray dried 310, resulting in a precursor solution 312. Additionally, the precursor solution 312 may then be calcined 314 (process of calcination 314). In one embodiment, calcination 314 may include an inert gas (e.g. Nitrogen, Air+Nitrogen, Air+Argon (Ar), Argon, and/or Argon+Hydrogen ($H_2$), etc.) atmosphere at extremely high temperatures before producing a finished metal-metal carbide decorated carbon composite 316.

In one embodiment, the binder 302 may include one or more of polyacrylonitrile (PAN), poly methylmethacrylate (PMMA), and/or polyethylenimine (PEI). In a related embodiment, the metal precursor 304 may include at least one of: Ammonium Metatungstate, $(NH_4)_6[H_2W_{12}O_{40}]$, Tungsten Trioxide ($WO_3$), Metallic Tungsten (W), Tungstic acid (WO3. H2O), Sodium tungstate dihydrate (Na2WO4. 2H2O), and/or Tungsten Disulfide ($WS_2$). In a related embodiment, the binder 302, the metal precursor 304, and/or the carbon source 306 may be combined in a solvent like Dimethylformamide (DMF) to facilitate the subsequent spray drying 310. In one embodiment, the solvent may include both organic and/or inorganic solvents.

In another embodiment, the calcination 314 may require applied temperatures between 850 and 1,200 degrees Celsius.

In a further embodiment, after completion of the calcination 314, one or more of metal particle and/or carbon particle compounds may be present in the metal-metal carbide decorated carbon composite 316. In addition, it should be noted that the combination of the metal particle and/or the carbon particle in the metal-metal carbide decorated carbon composite 316 may manifest themselves as metal particles disbursed within a carbon particle structure. For example, in one embodiment, the metal particles may be contained within a spherical carbon particle structure.

Figure 4:
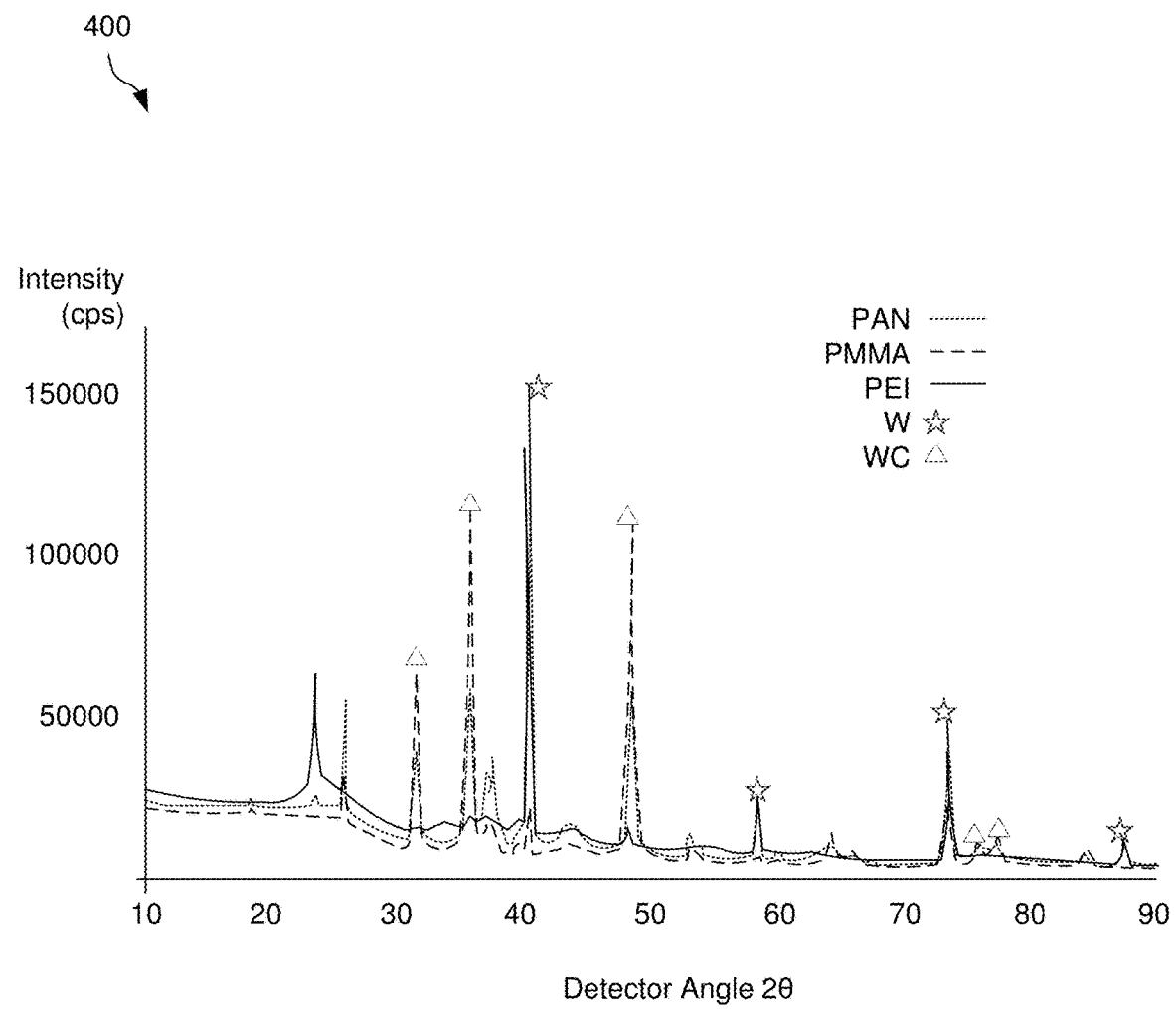
FIG. 4 illustrates X-ray diffraction intensity data corresponding with metal-metal carbide decorated carbon composite samples based on a variety of binders, in accordance with one embodiment.

FIG. 4 illustrates X-ray diffraction intensity data 400 corresponding with metal-metal carbide decorated carbon composite samples based on a variety of binders, in accordance with one embodiment. As an option, the X-ray diffraction intensity data 400 may be implemented in the context of any one or more of the embodiments set forth in any previous and/or subsequent figure(s) and/or description thereof. Of course, however, the X-ray diffraction intensity data 400 may be implemented in the context of any desired environment. Further, the aforementioned definitions may equally apply to the description below.

As shown, the X-ray diffraction intensity data 400 plotted via X-ray diffraction spectroscopy (XRD) may comprise a measure of wavelengths detected at each 2θ degree angle of the detector along the x-axis of a graph, while the y-axis depicts an intensity of one or more binders including, but not limited to, polyacrylonitrile (PAN), poly methylmethacrylate (PMMA), and/or polyethylenimine (PEI) to produce a ratio of resulting Tungsten-Tungsten Carbide (W-WC) presented in units of count per second (cps).

In one embodiment, the X-ray diffraction spectroscopy (XRD) results may be derived from application of the spectroscopy at a 2θ-degree angle upon the surface of the metal-metal carbide decorated carbon composite 316. Additionally, the "peaks" viewed in the spectroscopy results may indicate the presence of the metal particles disbursed within a carbon particle structure. For example, the presence of tungsten (represented by stars in the X-ray diffraction intensity data 400) and/or tungsten-carbide (represented by triangles in the X-ray diffraction intensity data 400) may be observed.

Figure 5:
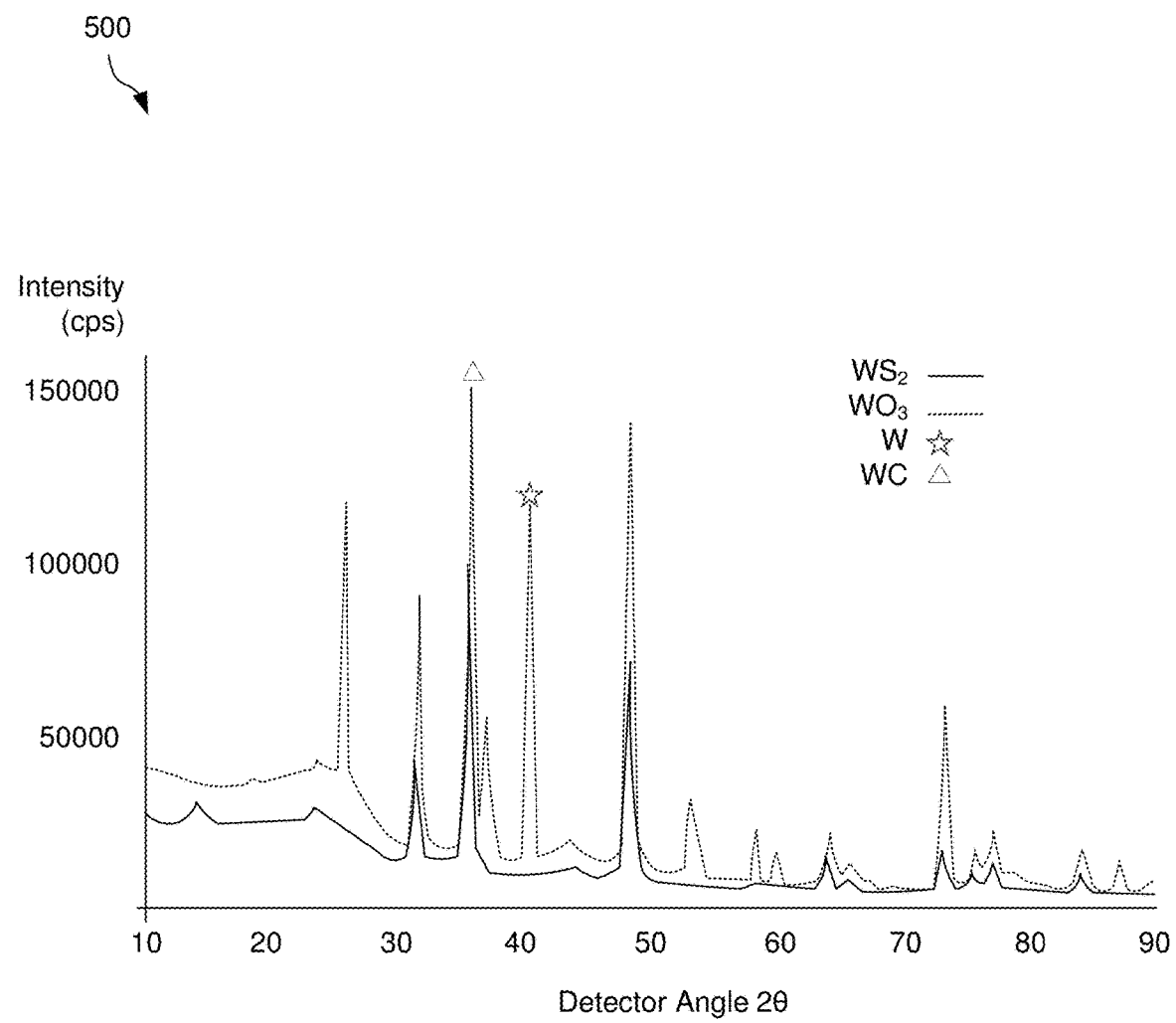
FIG. 5 illustrates X-ray diffraction intensity data corresponding with metal precursors, in accordance with one embodiment.

FIG. 5 illustrates X-ray diffraction intensity data 500 corresponding with metal precursors, in accordance with one embodiment. As an option, the X-ray diffraction intensity data 500 may be implemented in the context of any one or more of the embodiments set forth in any previous and/or subsequent figure(s) and/or description thereof. Of course, however, the X-ray diffraction intensity data 500 may be implemented in the context of any desired environment. Further, the aforementioned definitions may equally apply to the description below.

As shown, X-ray diffraction intensity data 500 plotted via X-ray diffraction spectroscopy (XRD) may comprise a measure of wavelengths detected at each 2θ degree angle of the detector along the x-axis of a graph, while the y-axis depicts an intensity of one or more resultant precursors including, but not limited to, Tungsten Disulfide ($WS_2$) and/or Tungsten Trioxide ($WO_3$) presented in units of count per second (cps). Additionally, the "peaks" viewed in the spectroscopy results may indicate the presence of the metal particles disbursed within a carbon particle structure. For example, the presence of tungsten (represented by stars in the X-ray diffraction intensity data 500) and/or tungsten-carbide (represented by triangles in the X-ray diffraction intensity data 500) may be observed.

Figure 6:
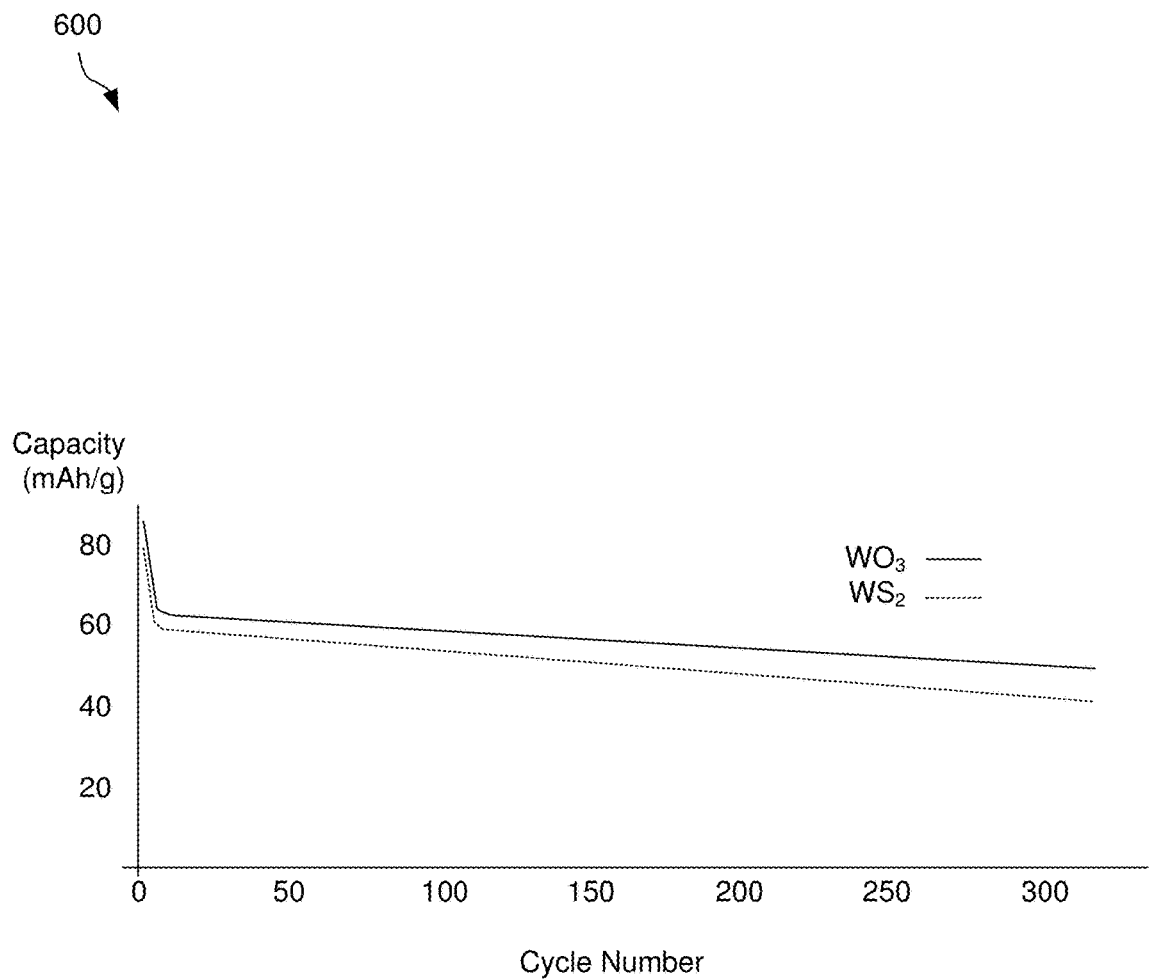
FIG. 6 illustrates cycle life data based on metal precursors, in accordance with one embodiment.

FIG. 6 illustrates cycle life data 600 based on metal precursors, in accordance with one embodiment. As an option, the cycle life data 600 may be implemented in the context of any one or more of the embodiments set forth in any previous and/or subsequent figure(s) and/or description thereof. Of course, however, the cycle life data 600 may be implemented in the context of any desired environment. Further, the aforementioned definitions may equally apply to the description below.

As shown, cycle life data 600 may comprise a measure of resulting battery capacity, represented in milliampere-hours per gram (mAh/g) units, along the y-axis of a graph, while the x-axis may depict the number of charging-discharging cycles for the battery cell under scrutiny.

In one embodiment, cycle life data 600 may indicate an increase in sustained battery capacity through the use of Tungsten Trioxide ($WO_3$) and/or Tungsten Disulfide ($WS_2$). For example, $WO_3$ being smaller sized precursor may result in smaller metal-metal carbide. Additionally, sometimes, at a lower temperatures, a metal-metal oxide-metal carbide (triple phase) may result irrespective of the precursor used. Further, $WO_3$ is finer in size (<100 nm) compared to $WS_2$ (<1 um). Because of the difference in size, the resulting W-WC compound with $WO_3$ precursor is smaller in particle size compared to the one obtained from $WS_2$. Smaller particles may impart better catalytic activity and improve the sulfur utilization thus improving the performance. In this manner, one or other possible reasons may influence sustained battery capacity.

Figure 7:
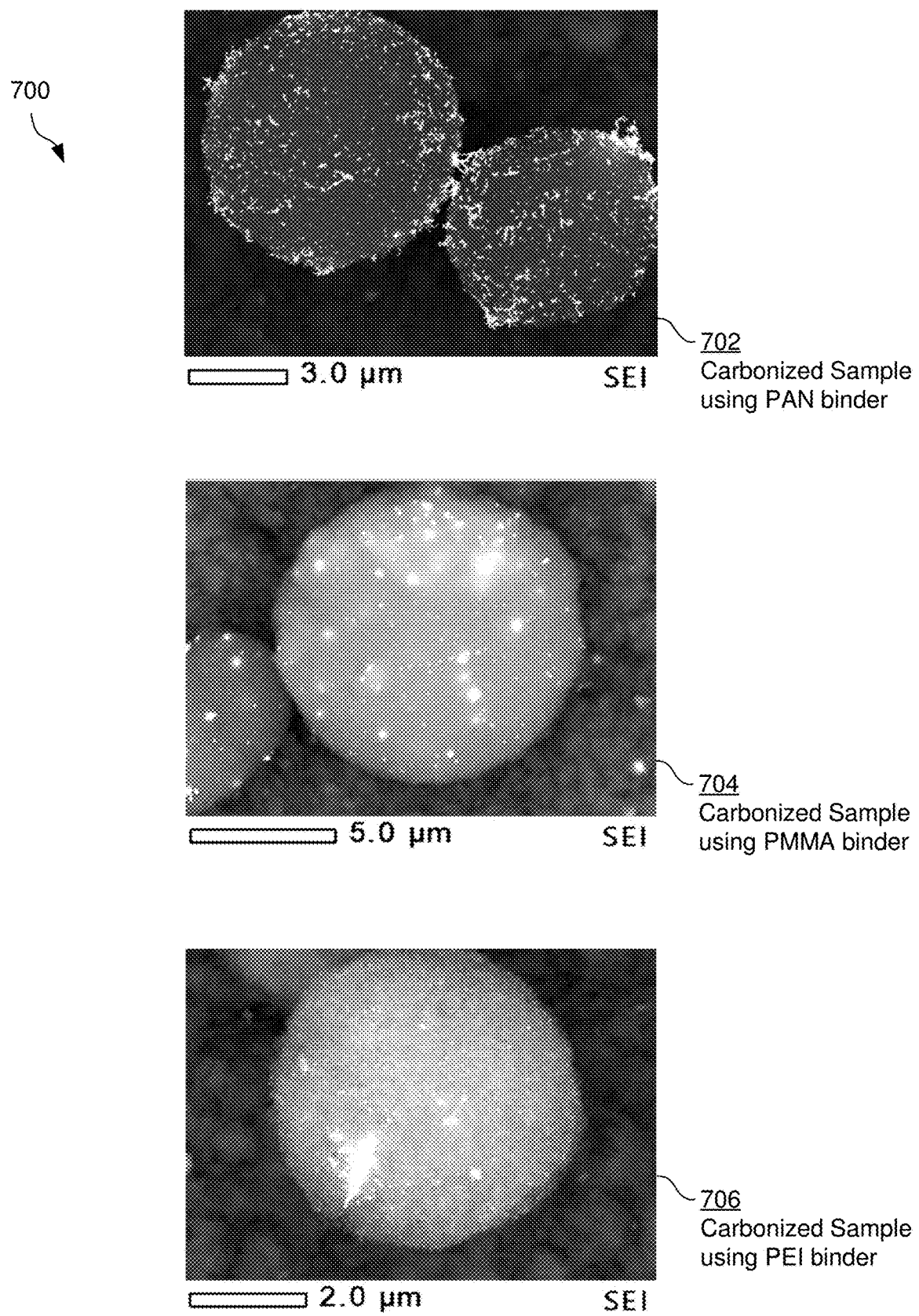
FIG. 7 illustrates metal-metal carbide decorated carbon composite samples using a variety of binders, in accordance with one embodiment.

FIG. 7 illustrates metal-metal carbide decorated carbon composite samples 700 using a variety of binders, in accordance with one embodiment. As an option, the metal-metal carbide decorated carbon composite samples 700 may be implemented in the context of any one or more of the embodiments set forth in any previous and/or subsequent figure(s) and/or description thereof. Of course, however, the metal-metal carbide decorated carbon composite samples 700 may be implemented in the context of any desired environment. Further, the aforementioned definitions may equally apply to the description below.

As shown, metal-metal carbide decorated carbon composite samples 700 recorded via scanning electron microscopy (SEM) may include, but are not limited to, a carbonized sample derived from a polyacrylonitrile (PAN) binder 702 (measuring approximately 6 microns in diameter), a carbonized sample derived from a poly methylmethacrylate (PMMA) binder 704 (measuring approximately 9 microns in diameter), and/or a carbonized sample derived from a polyethylenimine (PEI) binder 706 (measuring approximately 4 microns in diameter).

In one embodiment, the metal-metal carbide decorated carbon composite samples 700 may comprise an otherwise "fine distribution" of Tungsten metal in the case of the sample derived from the polyacrylonitrile (PAN) binder 702. In another embodiment, the metal-metal carbide decorated carbon composite samples 700 may comprise "chunks" of Tungsten Carbide in the case of the sample derived from the poly methylmethacrylate (PMMA) binder 704. In a further embodiment, the metal-metal carbide decorated carbon composite samples 700 may comprise a "finest distribution" of Tungsten metal in the case of the sample derived from the polyethylenimine (PEI) binder 706.

In some implementations, the specific material and methods employed (e.g., for increasing catalytic activity of electrocatalysts) may depend on the type of battery or cell construct in which the specific material is incorporated (e.g., cylindrical cells compared to pouch cells and/or prismatic cells).

For example, in some implementations, the disclosed material layer may be incorporated into pouch cells and/or prismatic cells. For example, the disclosed material layer may be incorporated into jelly roll type cells where two mandrel wound electrodes may be produced in a manner similar to cylindrical cells as discussed earlier. Additionally or alternatively, the disclosed material layer may be incorporated into stacked plate type cells, which stacked plate type cells may be assembled using a sheet that includes the disclosed material layer.

Lithium-sulfur based batteries such as disclosed herein may be ideal for powering electric vehicles (e.g., due high energy density). Moreover, certain effects that are exhibited in Lithium-sulfur based batteries may be exploited in certain applications such as in airborne applications (e.g., aircraft, drones, etc.) and/or in space-based applications (e.g., satellites or other orbiting applications).

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A material, comprising:
   synthesized carbon-containing composite materials;
   synthesized metal-metal carbides; and
   a heterostructure material comprising the synthesized carbon-containing composite materials and the synthesized metal-metal carbides, wherein the synthesized metal-metal carbides are atom-decorated, at least in part, on the synthesized carbon-containing composite materials;
   wherein the heterostructure material is used in an electrochemical device.

2. The material of claim 1, wherein the synthesized metal-metal carbides comprise, at least in part, at least one of: Tungsten-Tungsten Carbide (W-WC), a Tungsten-based compound, or at least one metal.

3. The material of claim 1, wherein the heterostructure material is configured to reduce a polysulfide shuttle effect.

4. The material of claim 1, wherein the heterostructure material is configured as at least one of: a cathode material, a separator coating, an interlayer, a coating, or an anode-coating.

5. The material of claim 1, wherein the synthesized metal-metal carbides are configured based on a binder.

6. The material of claim 1, wherein a particle size of the heterostructure material is configured based on the synthesized metal-metal carbides.

7. The material of claim 1, wherein a particle composition of the heterostructure material is configured based on the synthesized metal-metal carbides.

8. The material of claim 1, wherein the heterostructure material is configured to increase conductivity or kinetics.

9. The material of claim 1, wherein the heterostructure material is configured to increase catalytic activity.

10. The material of claim 9, wherein the catalytic activity is configured based on a particle size and composition of the heterostructure material.

11. The material of claim 1, wherein the electrochemical device includes an electrochemical cell in at least one of: cylindrical format, pouch format, or prismatic format.

12. A material, comprising:
    synthesized carbon-containing composite materials;
    synthesized metal-metal carbides; and
    a heterostructure material comprising the synthesized carbon-containing composite materials and the synthesized metal-metal carbides, wherein the synthesized metal-metal carbides are atom-decorated, at least in part, on the synthesized carbon-containing composite materials;
    wherein the heterostructure material is configured as at least one of: a cathode material, a separator coating, an interlayer, a coating, or an anode-coating.

13. A material, comprising:
    synthesized carbon-containing composite materials;
    synthesized metal-metal carbides; and
    a heterostructure material comprising the synthesized carbon-containing composite materials and the synthesized metal-metal carbides, wherein the synthesized metal-metal carbides are atom-decorated, at least in part, on the synthesized carbon-containing composite materials;
    wherein at least one of a particle size or a particle composition of the heterostructure material comprising the synthesized metal-metal carbides is based, at least in part, on a binder.

* * * * *